US010595422B2

United States Patent
Campbell et al.

(10) Patent No.: US 10,595,422 B2
(45) Date of Patent: *Mar. 17, 2020

(54) TAMPER RESISTANT ELECTRONIC DEVICES

(71) Applicant: International Business Machines Corporation, Armonk, NY (US)

(72) Inventors: Eric J. Campbell, Rochester, MN (US); Sarah K. Czaplewski, Rochester, MN (US); Patrick K. Egan, Rochester, MN (US); Joseph Kuczynski, North Port, FL (US); Timothy J. Tofil, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 548 days.

This patent is subject to a terminal disclaimer.

(21) Appl. No.: 15/299,270

(22) Filed: Oct. 20, 2016

(65) Prior Publication Data

US 2018/0116060 A1   Apr. 26, 2018

(51) Int. Cl.
| | |
|---|---|
| H01M 6/36 | (2006.01) |
| H05K 5/02 | (2006.01) |
| H01M 2/36 | (2006.01) |
| G06F 21/86 | (2013.01) |

(52) U.S. Cl.
CPC ........... *H05K 5/0208* (2013.01); *G06F 21/86* (2013.01); *H01M 2/36* (2013.01); *H01M 6/36* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,481,790 A | | 12/1969 | Duddy | |
| 4,009,055 A | * | 2/1977 | Fujiwara | H01M 6/36 |
| | | | | 340/592 |
| 4,811,288 A | * | 3/1989 | Kleijne | G06F 21/71 |
| | | | | 340/652 |

(Continued)

FOREIGN PATENT DOCUMENTS

| | | | |
|---|---|---|---|
| WO | WO 2009035728 A1 | * | 3/2009 |
| WO | 2013041871 A2 | | 3/2013 |

OTHER PUBLICATIONS

U.S. Appl. No. 15/299,257 entitled "Tamper Resistant Electronic Devices," filed Oct. 20, 2016.

(Continued)

*Primary Examiner* — Alexander Usyatinsky
(74) *Attorney, Agent, or Firm* — Patterson + Sheridan, LLP

(57) ABSTRACT

A tamper resistant device comprises an internal component, such as an electronic device, and a latent battery that is connected to the internal component. An activator material is separated from the latent battery by a rupturable barrier that is adapted to rupture, shatter, or otherwise degrade in response to a stimulus associated with a physical tampering event. The activator material is a material that causes the latent battery to output electrical power when in contact with the latent battery. In some examples, the electrical power provided when the activator material contacts the latent battery is used to trigger a security response which can include transmission of an alarm signal and/or erasure of data stored by the internal component.

11 Claims, 5 Drawing Sheets

(56) References Cited

U.S. PATENT DOCUMENTS

| | | | |
|---|---|---|---|
| 4,948,683 A * | 8/1990 | Picozzi | H01M 6/38 |
| | | | 429/116 |
| 5,325,721 A | 7/1994 | Pendergrass, Jr. | |
| 5,406,630 A | 4/1995 | Piosenka et al. | |
| 6,217,213 B1 | 4/2001 | Curry et al. | |
| 7,223,964 B2 | 5/2007 | Wiese et al. | |
| 7,247,791 B2 | 7/2007 | Kulpa | |
| 7,362,248 B2 | 4/2008 | McClure et al. | |
| 7,385,491 B2 | 6/2008 | Doi | |
| 7,443,176 B2 | 10/2008 | McClure et al. | |
| 7,479,344 B1 * | 1/2009 | McDermott | H01M 2/1077 |
| | | | 429/110 |
| 7,573,301 B2 | 8/2009 | Walmsley | |
| 7,830,021 B1 | 11/2010 | Wilcoxon et al. | |
| 8,502,396 B2 | 8/2013 | Buer et al. | |
| 8,522,049 B1 | 8/2013 | Ahmadi | |
| 8,623,418 B2 | 1/2014 | Liang et al. | |
| 8,865,285 B2 | 10/2014 | Dagher et al. | |
| 9,245,202 B2 | 1/2016 | Boday et al. | |
| 2005/0031688 A1 | 2/2005 | Ayala | |
| 2007/0207284 A1 | 9/2007 | McClintic | |
| 2009/0042065 A1 * | 2/2009 | Simon | G01D 5/60 |
| | | | 429/8 |
| 2009/0155571 A1 | 6/2009 | Mustonen | |
| 2010/0006431 A1 | 1/2010 | Wallace et al. | |
| 2015/0169015 A1 | 6/2015 | Yebka et al. | |

OTHER PUBLICATIONS

U.S. Appl. No. 15/816,093 entitled "Tamper Resistant Electronic Devices," filed Nov. 17, 2017.
List of IBM Patents or Applications Treated as Related.
List of IBM Patents or Patent Applications Treated as Related, as of Oct. 20, 2016.

* cited by examiner

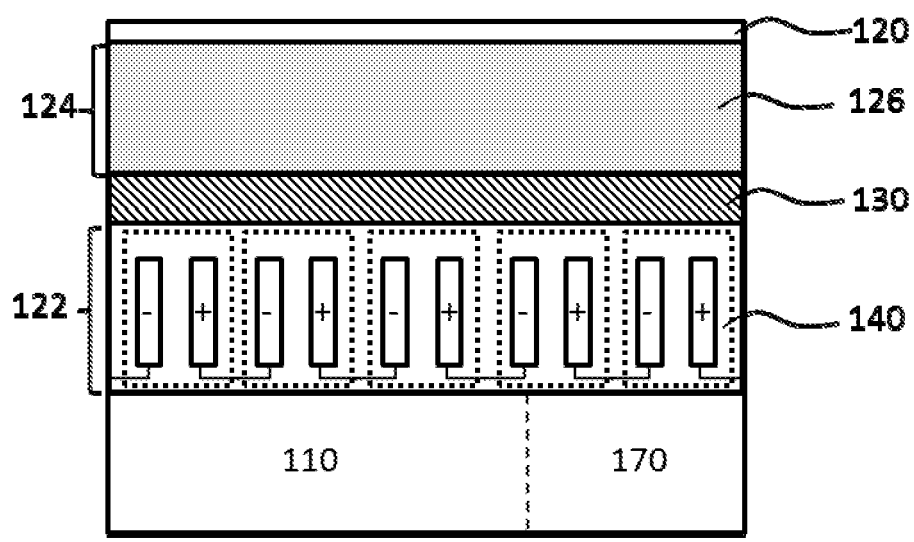
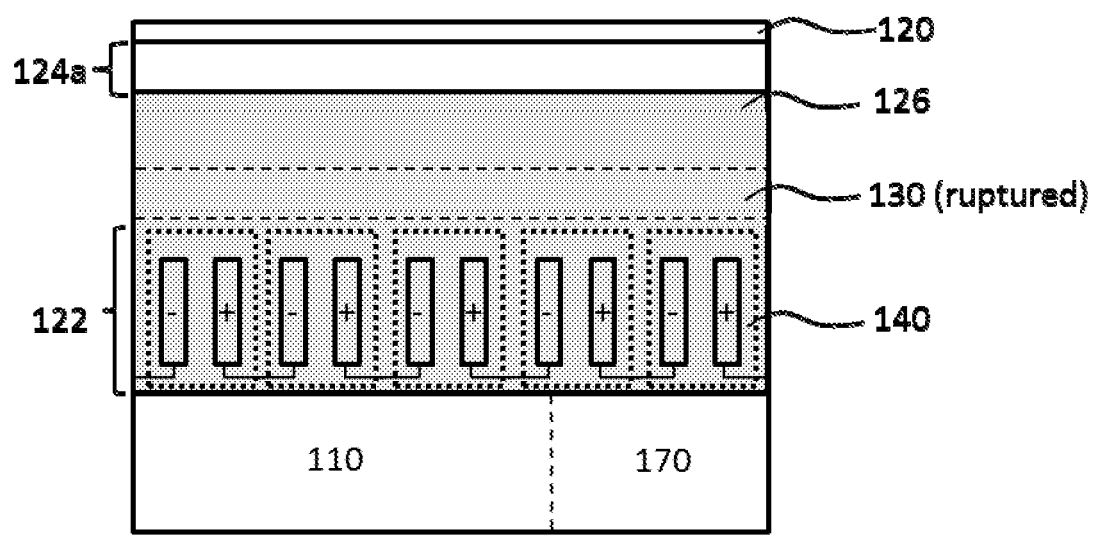

TAMPER RESISTANT ELECTRONIC DEVICES

BACKGROUND

The present disclosure concerns physical security of electronic components in computing systems.

Computing systems include electronic components such as security devices and cryptographic modules to prevent data theft and the like. These devices and modules provide data security in personal computing systems and high-end network servers. These devices and modules are, for example, implemented as a device card or on a printed circuit board. To meet industry accepted standards for protection, these devices and modules must incorporate features and mechanisms that provide physical security for internal device components such that physical attempts to access or tap internal components can be detected and/or responded to in a manner that resists tampering and/or unauthorized access of data.

SUMMARY

According to one embodiment, a tamper resistant apparatus comprises an internal component and a latent battery connected to the internal component. An activator material is separated from the latent battery by a rupturable barrier. The activator material is a material that causes the latent battery to output electrical power when contacting or interacting with the latent battery. In this context, a "latent battery" is a battery that is completed or otherwise electrically activated by contact or similar interaction with the activator material.

According to another embodiment, a secured device comprises an electronic component and a casing surrounding the electronic component. The casing includes a latent battery electrically connected to the electronic component, a reservoir filled with an activator material, and a rupturable barrier separating the activator material from the latent battery. The activator material causes the latent battery to output electrical power when in contact with the latent battery.

According to still another embodiment, a method comprises obtaining a secured device including an electronic component and a casing surrounding the electronic component. The casing includes a latent battery electrically connected to the electronic component; a reservoir filled with an activator material that causes the latent battery to output electrical power when in contact with the latent battery; and a rupturable barrier separating the activator material from the latent battery. The method further comprises monitoring an electrical power output of the latent battery and triggering a security response operation when the latent battery outputs electrical power.

BRIEF DESCRIPTION OF THE DRAWINGS

FIGS. 2A and 2B depict aspects of a secured device of a first example.

DETAILED DESCRIPTION

Secured devices, such as encryption modules, that are resistant to physical tampering are used in various computing systems to protect sensitive data and components. For example, stored data that might be effectively invulnerable to unauthorized access via software protocols might be relatively easily accessed by direct, physical means, even if the stored data is notionally protected by encryption. Such physical access might entail drilling through, or physical removal of, portions of an outer casing or packaging of an electronic component. Physical access to internal device components might allow various data protective features of the device to be overridden or avoided such that otherwise protected data could be accessed. For example, by making direct electrical connections to various internal components, an encryption module might be effectively disabled or overridden. Alternatively, physical access to internal device components might allow incoming and outgoing data to be monitored or redirected in an unauthorized manner.

Figure 1:
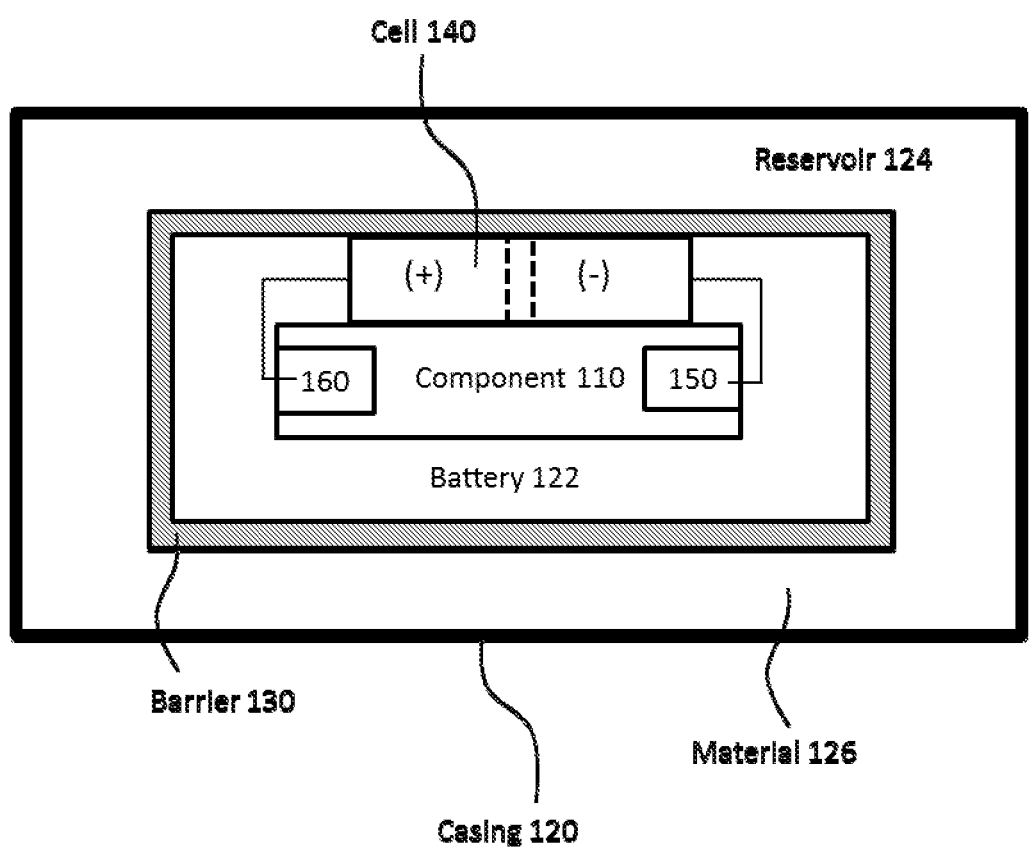
FIG. 1 depicts a secured device including a latent battery.

FIG. 1 depicts a secured device 100 including an internal component 110 and a casing 120 surrounding the internal component 110. The secured device 100 may be, without limitation, a circuit board, a packaged integrated circuit, a microchip, a microprocessor, an electronic card device, a cartridge device, a cryptographic module, a data storage module, a memory card, a disk drive, a solid-state storage device, or combinations of these elements. In some examples, a secured device 100 may be referred to as a tamper resistant device. The internal component 110 may be, without limitation, a circuit board, an integrated circuit, a packaged integrated circuit, a microchip, a microprocessor, an electronic card device, a cartridge device, a cryptographic module, a data storage module, a memory card, a disk drive, a solid-state storage device, or combinations of these elements. Additionally, while a single internal component 110 is depicted in the secured device 100 of FIG. 1, a plurality of internal components 110 may be provided within casing 120.

Casing 120 is depicted in FIG. 1 as completely encasing or surrounding internal component 110 and while this might be an ideal arrangement from the standpoint of physical security, it may or may not be necessary or achievable in practice and various portions of the internal component 110 might be left uncovered as needed for mounting or connecting the secured device 100 within a computing system. For example, various terminals, leads, contacts, or wires might be left exposed by, or allowed to protrude from, casing 120.

In FIG. 1, a battery 122 and a reservoir 124 are provided in the casing 120. The reservoir 124 contains an activator material 126. The reservoir 124 is separated from the battery 122 by a rupturable barrier 130. The rupturable barrier 130 is a layer, a sheet, a membrane, or other structure which is adapted to maintain separation between the battery 122 and the activator material 126 until such time as a physical tampering is attempted on casing 120. When a physical tampering is attempted, the rupturable barrier 130 ruptures, shatters, or otherwise degrades to permit the activator material 126, initially contained in the reservoir 124, to contact or otherwise interact with the battery 122 in such a manner as to cause, permit, or allow the battery 122 to generate electric power. That is, battery 122 is initially in a latent or incomplete state in which electrical power is not being generated (or not substantially or usefully so). Then, the activator material 126 that is released from the reservoir 124 by the rupturing of rupturable barrier 130 activates or completes the battery 122 by which electrical power is consequently supplied to the internal component 110 from the battery 122. Prior to contact with or other interaction with the activator material 126, battery 122 may be referred to as a latent battery or an incomplete battery. Once battery 122 has been contacted by, or otherwise has interacted with, activator material 126, it may be referred to as an active battery, an activated battery, a complete battery, a completed battery, or a non-latent battery.

In a particular example, the activator material 126 is an aqueous salt solution, but the activator material 126 is not limited to aqueous salt solutions and, in general, may be any material that interacts with battery 122 to cause the battery 122 to generate electricity. The activator material 126 in some instances may be referred to as an electrolyte or an electrolytic material. The activator material 126 in some examples may be a non-aqueous solution or a non-aqueous fluid. The activator material 126 may be an acidic or basic substance in some instances. In other examples, activator material 126 may be a powdered substance that ultimately dissolves in a fluid that is initially disposed on the battery 122 side of the rupturable barrier 130. The activator material 126 may comprise a saturated salt solution and a residual, undissolved salt material. When the activator material 126 is an aqueous salt solution, a plurality of different salts may be present in the solution. In some instances, the activator material 126 may be referred to as "activating" the battery 122 and/or "completing" the battery 122, which, in each instance, means the activator material 126 causes or permits battery 122 to transition from an initial, low power output state to a subsequent, higher power output state.

The reservoir 124 may comprise a void space found between structural components of the casing 120 and the rupturable barrier 130. The reservoir 124 is not limited to simple void space and may include without limitation distinct structural elements, porous materials, sponge-like materials, meshes, cells, bladders, membranes, or the like. An outer wall of reservoir 124 may be a self-healing membrane material in some instances. For example, a portion of casing 120 contacting or exposed to reservoir 124 may include or be coated with a self-healing membrane material to limit loss of activator material 126 which might otherwise be caused by physical tampering events.

The reservoir 124 may contain substances other than activator material 126 either as discrete materials or in solution/mixture with activator material 126. For example, anti-freeze components may be included when activator material 126 is provided as a liquid, and anti-caking components and/or desiccants may be included when activator material 126 is provided as a powder or other particulates.

The battery 122 is positioned inside casing 120. The battery 122 is configured to output electric power in response to contact with or exposure to the activator material 126. The battery 122 is otherwise in a latent or inactive state. In this example, battery 122 is adapted to act as a galvanic cell when the activator material 126 is present. However, more generally, battery 122 is a component which provides electrical power (or substantially increases its electrical power output) in response to exposure/contact with activator material 126.

The particular materials and designs for battery 122 can be selected according to known electrochemical combinations and battery technologies. For example, the redox reaction between zinc-copper metals may be the basis of the galvanic action of the battery 122. A lead-acid type battery (functioning on the overall basis of: Pb (s)+PbO$_2$(s)+ 2H$_2$SO$_4$ (aq)→2PbSO$_4$(s)+2H$_2$O) could be established as battery 122.

In a particular example, battery 122 may comprise a magnesium anode and a lead dioxide cathode deposited on a high surface area substrate, such as a graphite fabric, with saltwater functioning as an electrolyte/activator 126. An arrangement and preparation of such a battery is disclosed in U.S. Pat. No. 3,481,790, "Seawater reserve battery having magnesium anode and lead dioxide-graphite fabric cathode," patented on Dec. 2, 1969, the entire contents of which is incorporated herein by reference. Other arrangements are, of course, possible, and battery 122 is not limited to the particular examples described.

The battery 122 may include at least one cell 140 that has an anode (−) connected to a first terminal 150 and a cathode (+) connected to a second terminal 160. Here, the first terminal 150 and the second terminal 160 are portions of, or otherwise connected to, internal component 110. When battery 122 is an inactive state (e.g., no electrical power being supplied by the battery 122), cell 140 is a latent electrochemical cell. The latent cell 140 activates (e.g., the electrochemical cell reaction commences) when exposed to the activator material 126. The configuration and/or composition of cell 140 are not otherwise limited.

Battery 122 is depicted in FIG. 1 as surrounding internal component 110, but battery 122 is not required to fully surround internal component 110. Battery 122 can be positioned in certain discrete areas or regions of casing 120. Battery 122 is not required to be continuous and can be provided in several portions that are spaced from each other. Likewise, when a plurality of cells 140 are provided, these cells 140 may be spaced from each other or they may be directly adjacent to each other within a battery 122.

In some examples, battery 122 may be provided only on a single side of the internal component 110. For example, casing 120 and/or battery 122 may be provided only on a side/surface of the internal component 110 considered particularly vulnerable to physical tampering efforts. Similarly, FIG. 1 does not specifically depict any physical separation between internal component 110 and battery 122, but adjacency is not a requirement. Internal component 110 can be physically separated or isolated from battery 122 (other than the electrical connections to the first and second terminals 150 and 160).

Similarly, the depiction of relative sizes of each component of secured device 100 in FIG. 1 is not intended to be to scale. In some instances, the sizing of battery 122 may be set based on the current/voltage requirements of internal component 110 for purposes of anti-tampering operations. Likewise, in some instances, the size of reservoir 124 and amount of activator material 126 may be set based on the sizing of battery 122 and current/voltage requirements of internal component 110 for anti-tampering operations. In some embodiments, a fluid storage capacity (storage volume) may match an empty cell volume of the battery 122, but such is not required in all examples. For example, the fluid storage capacity of reservoir 124 may greatly exceed the empty cell volume of battery 122 to account for possible losses of activator material 126 during tampering events or to account for empty volume of other components that might be physically adjacent or connected to battery 122.

The electrical connections between respective anode/cathodes of cell(s) 140 and first terminal 150 and second terminal 160 may be made in any convenient manner, such as wiring, wire bonding, plugs, connectors, soldering, surface mounting, or the like. The connection between anodes/cathodes of cell(s) 140 and internal component 110 need not be direct and may include additional components in the electrical pathway, for example, switches, protective diodes, or the like.

Likewise, the connection between any particular cell 140 and the internal component 110 may be made through connections via one or more cells 140 connected in series with the particular cell 140. When a plurality of cells 140 are provided, they may all be connected in series with one another (i.e., anode to cathode) or some portion of the plurality of cells 140 may be connected in parallel with another portion of the plurality of cells 140. Also, a cell 140 may be connected to more than one pair of terminals on the internal component 110. Similarly, when a plurality of internal components 110 are provided, a cell 140 may be connected to a pair of terminals on each internal component 110 or only a pair of terminals on some subset of the plurality of internal components 110.

The rupturable barrier 130 separating reservoir 124 from the battery 122 may be any material or structure that will fracture, shatter, rupture, or otherwise degrade as an effective fluid barrier in response to a stimulus likely to be associated with a tampering event. For example, the rupturable barrier 130 may be a glass with high internal tensile stress that will shatter in response to forces associated with physical tampering events, such as, for example, the drilling of casing 120. In other embodiments, the rupturable barrier 130 may respond to thermal stimulus events or electromagnetic stimulus events likely to be associated with certain types of tampering events.

The casing 120 may further include additional layers, structures, or components. For example, additional batteries 122 and reservoirs 124 may be provided. Additional layers may be included in or on casing 120 for various purposes, such as structural stability, chemical resistance, or other tamper prevention purposes, or the like. Such additional layers may be laminated (or otherwise mounted) on or within casing 120. For example, metal layers, radiation blocking layers, or the like might be included in or on casing 120. Similarly, metal meshes may be embedded in, included within, or laminated on casing 120 for various purposes.

Example Structures

FIGS. 2A and 2B depict aspects of a secured device of a first example. FIG. 2A shows a portion the secured device 100 that was depicted in FIG. 1. FIG. 2A depicts the secured device 100 with a still intact rupturable barrier 130. FIG. 2B depicts the secured device 100 after the barrier 130 has ruptured and activator material 126 has been allowed to contact battery 122. A portion of casing 120, which was described above, is depicted in FIGS. 2A and 2B.

In this example, battery 122 is depicted as including a plurality of cells 140 (in this instance five cells 140 connected in series are depicted). Additionally, the internal structure of each cell 140 depicted in FIGS. 2A and 2B has primarily been selected for purposes explaining operational concepts rather than any specific structural features. Each cell 140 may include discrete electrode plates as depicted, but the internal structure of each cell 140 is not limited to that depicted in these figures.

In the initial state (FIG. 2A), cells 140 each include anode and cathode, but no electrochemical reaction is occurring because there is no electrolyte present. Thus, in FIG. 2A no electrical power is being supplied from battery 122 to the internal component 110. The first terminal 150 and second terminal 160 are not specifically depicted in FIGS. 2A and 2B; however, these elements are present and respectively connected to one of the anode and cathode ends of the cells 140 connected in series.

A security response element 170 is depicted in FIGS. 2A and 2B. Here, security response element 170 is depicted as integrated within internal component 110, but in some examples security response element 170 may be a discrete component separate from internal component 110. In general, security response element 170 monitors the electrical output of battery 122 and, when battery 122 is activated (FIG. 2B), the security response element 170 triggers or performs a security response operation. For example, security response element 170 may be configured to erase or overwrite stored data of internal component 110 when powered by battery 122. In other examples, the security response operation might comprise triggering an alarm, transmitting an alarm signal, shutting down external or main power to the internal component, or the like.

In this example, activator material 126 is a liquid. For example, activator material 126 may be an aqueous salt solution selected so as to permit the battery 122 to generate electricity. When rupturable barrier 130 ruptures, activator material 126 flows from reservoir 124 into the battery 122 and completes the battery 122.

In FIG. 2B, the rupturable barrier 130 has ruptured and is no longer present as an effective barrier. While FIG. 2B depicts the ruptured rupturable barrier 130 as a region surrounded by a dotted line, the rupturable barrier 130 may be completely absent from its previous position, or fragmentary portions of rupturable barrier 130 may still remain. In general, it is only required that barrier 130 cease being a total barrier that completely prevents the activator material 126 from contacting the battery 122. Thus, for example, rupturing of rupturable barrier 130 might consist of only the formation of holes at certain points in the barrier rather than total removal. When rupturable barrier 130 is a highly stressed glass, then rupturing might result in shattering. In such instance, shards of rupturable barrier 130 would still be present even though such are not specifically depicted in FIG. 2B. Likewise, an empty portion 124a of reservoir 124 remaining in FIG. 2B is not necessarily to scale and is presented primarily to show the movement of activator material 126 from the initial space of reservoir 124 (FIG. 2A) to the empty space of battery 122. It should be noted that in some examples, battery 122 need not include void or empty space, but rather the cells 140 might be filled with a non-electrolytic fluid (e.g., high-purity water; compare fluid 145 discussed below) and activator material 126 might diffuse or mix into this fluid to complete battery 122. In this context, a non-electrolytic fluid is fluid that does not promote flow of current between cathode and anode of battery 122 when in contact with battery 122 at a level which is useable and/or sufficient for causing or permitting a security response operation.

Figure 3A:
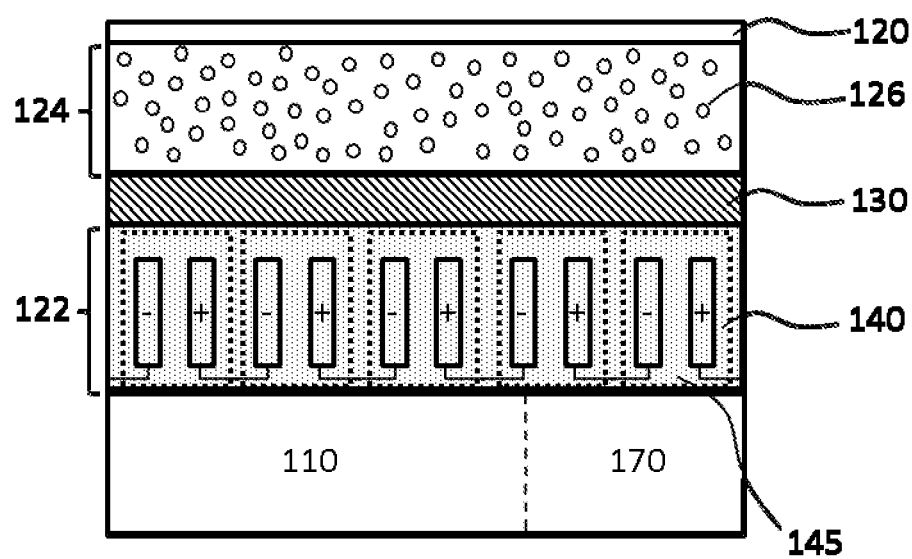
FIGS. 3A and 3B depicts aspects of a secured device of a second example.
Figure 3B:
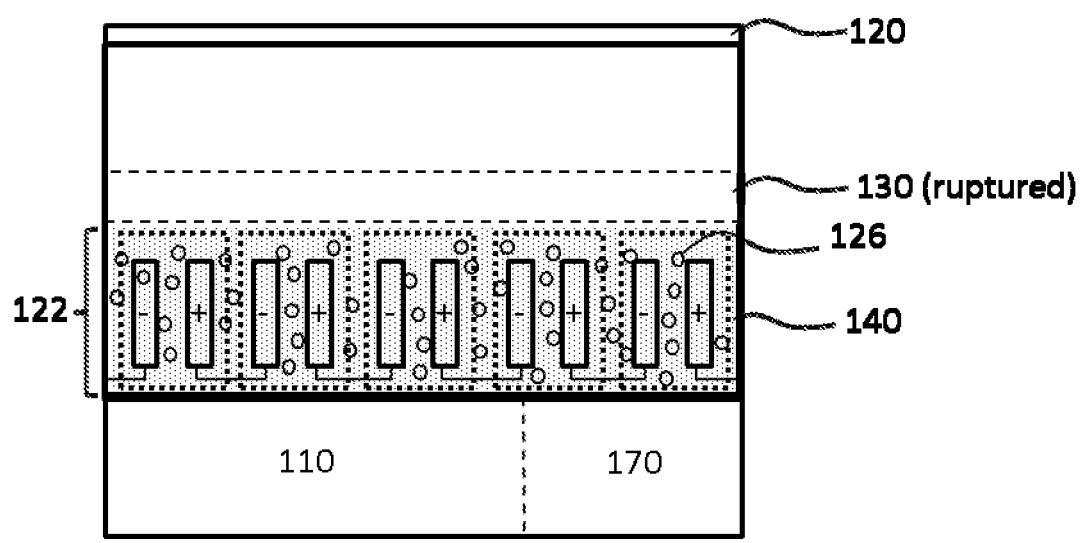

FIGS. 3A and 3B depicts aspects of a secured device of a second example. FIG. 3A depicts the secured device 100 with a still intact rupturable barrier 130. FIG. 3B depicts the secured device 100 after the barrier 130 has ruptured and activator material 126 has been allowed to contact battery 122. A portion of casing 120, which was described above, is depicted in FIGS. 3A and 3B. In this second example, activator material 126 is a powdered material (depicted as discrete particles for purposes of explanation). Battery 122 in the second example is filled with a non-electrolytic fluid 145 in the initial state (FIG. 3A). In general, the other depicted elements in FIGS. 3A and 3B are substantially the same as described above in conjunction with FIGS. 1, 2A, and 2B.

Figure 4:
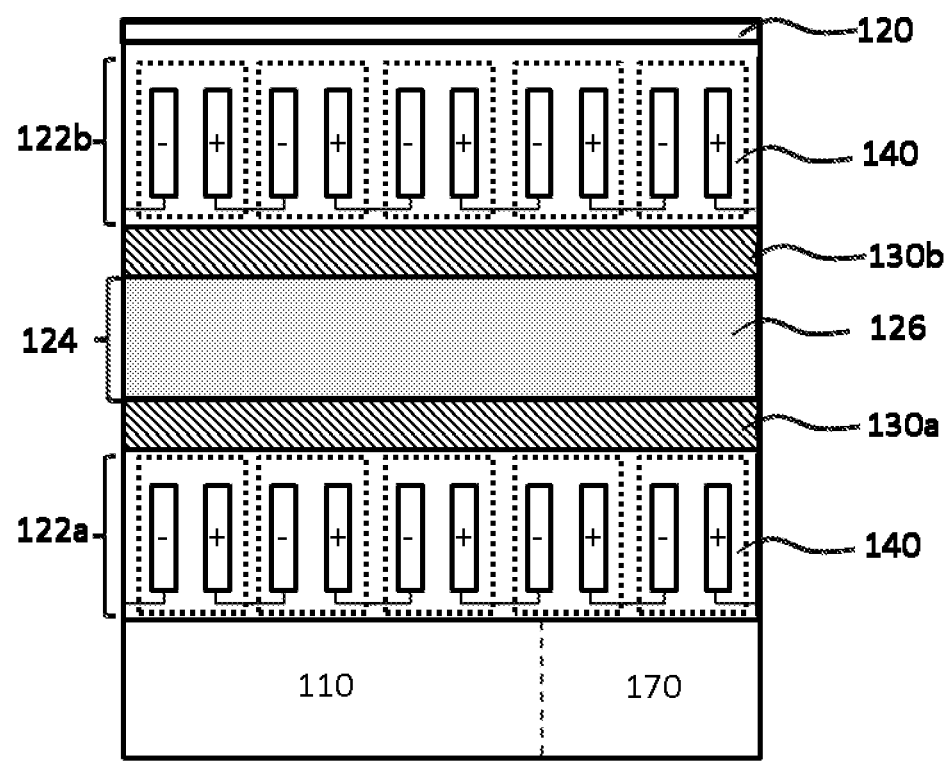
FIG. 4 depicts aspects of a secured device of a third example

FIG. 4 depicts aspects of a secured device of a third example. In the third example, the battery 122 is provided as a lower battery portion 122a and an upper battery portion 122b. Each battery portion (122a/b) is electrically connected to internal component 110. Activation of either or both of the lower or upper battery portions 122a and 122b can be used to trigger a security response operation. The rupturable barrier 130 is provided as a lower barrier portion 130a and an upper barrier portion 130b. In the third example, the reservoir 124 is disposed between the upper and lower battery portions 122a and 122b. This third example may be particularly advantageous with respect to prevention of backside drilling attempts intended to drain off activator material 126 from reservoir 124. The other elements depicted in FIG. 4 are substantially the same as described above in the conjunction with FIGS. 1, 2A, 2B, 3A, and 3B above. The third example can also be modified to incorporate aspects of the second example, such as inclusion of non-electrolyte fluid 145 in the battery portions 122a and 122b in the initial state. Likewise, activator material 126 in the third example can be either a solid or a liquid material.

Physical Security Process

In a particular embodiment of the present disclosure, a method comprises: obtaining a secured device having an electronic component and a casing. The casing surrounding the electronic component includes a secured device comprising a latent battery and an activator material separated from the latent battery by a rupturable barrier. The activator material is adapted to activate the latent battery when in contact or the like. The rupturable barrier is adapted to rupture in response to a stimulus, such as a tampering event. The method further comprises monitoring electrical power output from the secured device and using electrical power from the activated battery to trigger a security response operation.

Figure 5:
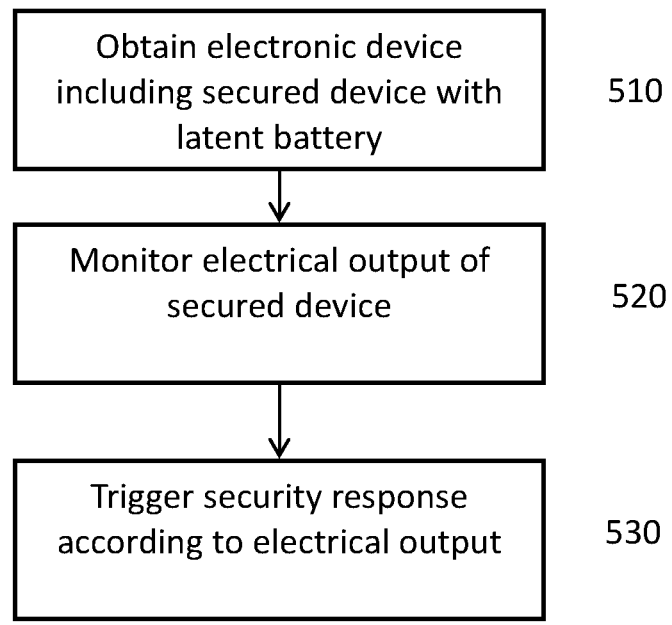
FIG. 5 depicts aspects of a method operating a secured device.

FIG. 5 depicts aspects of a method of providing physical security and tampering resistance for an electronic component. In security method 500, an electronic component encompassing a secured device, such as secured device 100, is obtained (aspect 510). Obtaining an electronic component according to aspect 510 may include fabricating/manufacturing the electronic component to include the secured device or purchasing or otherwise acquiring access to the electronic component already including the secured device. The electronic component may itself be the secured device, or the electronic component may be a larger apparatus in which secured device is merely a sub-component.

In aspect 520, the electrical power output of the secured device is monitored during operation of the electronic component. Monitoring in this context may include continuous or periodic active measurement or evaluation of current or voltage levels output from the secured device, or more particularly a battery element (latent battery) provided in the secured device. Monitoring in this context may also include, in some instances, passive evaluation processes such as would be the case when the battery element is merely connected to an electrical circuit or device element that activates, becomes operational, or otherwise alters operation, mode, or state in response to the output of electrical power from the battery element. For example, when a physical tampering event ruptures the rupturable barrier and consequently results in activation/completion of the latent battery, the monitoring circuit is activated and produces a security response operation.

In aspect 530, the secured device triggers a security response operation according to electric power output from activated battery. In this context, a security response is as described above and may include, without limitation, activating an alarm, transmitting a message, powering down one or more electronic components, erasing stored data, overwriting stored data with dummy data, triggering destruction of one or more electronic components. In a particular example, the electronic component is a solid-state storage device or card including non-volatile storage elements such as, for example, static random-access memory (SRAM) components, and the security response operation comprises erasing of data stored in the solid-state storage device using the electrical power supplied by the activated battery.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing is directed to embodiments of the present invention, other and further embodiments of the invention may be devised without departing from the basic scope thereof, and the scope thereof is determined by the claims that follow.

What is claimed is:

1. A tamper resistant apparatus, comprising:
an electronic device selected from the group consisting of a circuit board, a packaged integrated circuit, a microchip, a microprocessor, an electronic card device, a cartridge device, a cryptographic module, a data storage module, a memory card, a disk drive, a solid-state storage device, or a combination thereof, the electronic component internal to the tamper resistant apparatus;
a latent battery electrically connected to the electronic device, the latent battery internal to the tamper resistant apparatus; and
an activator material separated from the latent battery by a rupturable barrier, the rupturable barrier operable to release the activator material and cause the latent battery to output electrical power.

2. The tamper resistant apparatus of claim 1, wherein the rupturable barrier comprises a glass.

3. The tamper resistant apparatus of claim 1, wherein the activator material is an aqueous salt solution.

4. The tamper resistant apparatus of claim 1, wherein the activator material is a solid, and latent battery includes non-electrolytic fluid in which the activator material is soluble.

5. The tamper resistant apparatus of claim 4, wherein the non-electrolytic fluid is water.

6. The tamper resistant apparatus of claim 1, wherein the activator material is located in a reservoir,
the rupturable barrier includes a first portion on a first side of the reservoir and a second portion on a second side of the reservoir opposite the first side, and
the latent battery includes a first portion on the first side of the reservoir and a second portion on the second side of the reservoir.

7. The tamper resistant apparatus of claim 1, further comprising a casing which surrounds the electronic component and the latent battery.

8. The tamper resistant apparatus of claim 1, wherein the electronic component is configured to erase electronic data stored in the electronic component when electrical power is output by the latent battery.

9. The tamper resistance apparatus of claim 1, wherein the electronic component is configured to initiate a security response operation when electrical power is output by the latent battery.

10. The tamper resistant apparatus of claim 1, wherein the latent battery is a lead-acid type battery.

11. The tamper resistant apparatus of claim 1, wherein the latent battery comprises one or more electrochemical cells.

* * * * *